Nov. 26, 1963   B. CORNELISON   3,111,848
PRESSURE SENSITIVE GAUGE
Filed Dec. 29, 1960

FLUID PRESSURE

INVENTOR
Boyd Cornelison

BY
Stevens, Davis, Miller & Mosher
ATTORNEYS

United States Patent Office 3,111,848
Patented Nov. 26, 1963

3,111,848
PRESSURE SENSITIVE GAUGE
Boyd Cornelison, Dallas, Tex., assignor to Texas Instruments Incorporated, Dallas, Tex., a corporation of Delaware
Filed Dec. 29, 1960, Ser. No. 79,190
8 Claims. (Cl. 73—418)

This invention relates to a pressure sensitive gauge of fused quartz.

An instrument for measuring force due to changes in pressure, temperature etc. that utilizes fused quartz for supporting a sensitive element and for transferring the changes in force to such element in order to obtain a measurable output possesses many advantages over the prior art structures. Some of the major advantages are that fused quartz has a low coefficient of thermal expansion; it is nearly perfectly elastic providing a minimum of hysteresis; it can be made in one piece with no bearings so as to be free of friction; it can be made extremely small and can be enclosed in an evacuated chamber; and any changes in the modulus of rigidity of the system will cancel out.

It is therefore an object of this invention to provide a force measuring instrument in which the support for the sensitive element and all linkages are built entirely of quartz.

It is another object of this invention to provide a force measuring instrument of one-piece construction which will operate in a frictionless manner.

It is a further object of this invention to provide a force measuring device which is extremely rugged and compact yet highly sensitive and free of errors due to thermal effects.

Other objects and advantages of this invention will become apparent as a description of the invention proceeds.

Figure 1:
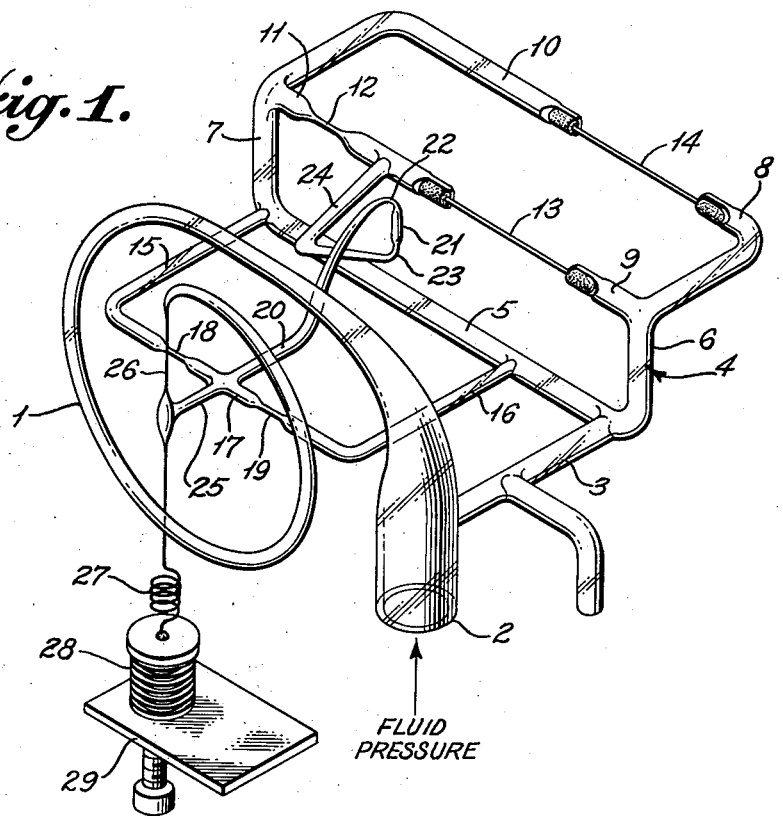
Figure 2:
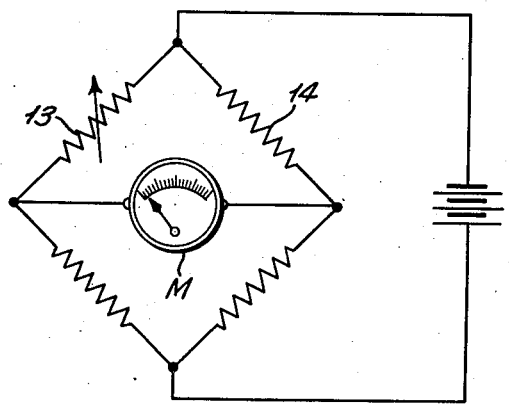

FIGURE 1 of the drawing shows the instrument of the invention in perspective; and FIGURE 2 is a schematic diagram of a circuit that can be used to provide an indication of the force applied to the sensitive elements incorporated in the instrument of FIGURE 1.

With reference to FIGURE 1 of the drawing, the one-piece fused quartz frame includes a Bourdon tube 1 of fused quartz which may be either sealed at its lower end 2 and enclosed in an evacuated container into which the pressure is admitted, or open at such end to admit fluid such as a gas or liquid under conditions of pressure that are to be measured. Integrally connected with the Bourdon tube 1 by strut 3 is a frame member of fused quartz generally indicated as 4. The frame member comprises a rigid bar 5 and two parallel side frame bars 6 and 7 extending from the ends of bar 5. Projecting a short distance from side bar 6 are two arms 8 and 9. Projecting from side bar 7 are two arms 10 and 11 in opposed relation to bars 8 and 9. A strain sensitive element 13 capable of changing its electrical resistance responsive to changes in stress applied to it extends between the inner ends of opposing arms 9 and 11, the ends of the element being secured to a respective arm by cement or other well known means such as soldering to a metal portion bonded to the quartz by a quartz to metal seal. A second like strain sensitive element 14 extends between the inner ends of arms 8 and 10 and secured at its ends to the respective arms in a similar manner.

Arm 11 is constructed so as to have an attenuated portion 12 intermediate its ends so as to form a torsional hinge connection between the adjacent arm portions. Projecting forwardly from the rigid frame bar member 5 is a pair of parallel spaced arms 15 and 16 which are spanned at their forward ends by a lever bar member 17 having a pair of spaced attenuated portions 18 and 19 which effectively form torsion hinges about which the center portion of bar member 17 can turn about its axis. Projecting rearwardly from the lever bar member 17 intermediate the attenuated portions, is a lever arm 20 integrally connected at its face end through a linearizing mechanism which also provides a mechanical amplification of the movement of the lever arm. The linearizing mechanism comprises a thrust member 21 depending at one end from the free end of the lever arm 20 by an attenuated portion 22 and connected at its other end through an attenuated portion 23 to the free end of an angularly extending portion of a lever 24. The other end of lever 24 is integral with that portion of arm 11 which is between one end of the strain sensitive element 13 and the attenuated portion 12 of the arm.

Projecting forwardly from lever bar portion 17 as an extension of lever arm 20 is a short lever arm 25 secured at its free end to a fused quartz filament 26 which depends from the tip of the spiral into which the Bourdon tube is shaped.

In the operation of the device, a change in pressure in the Bourdon tube causes the tip of the tube to move in the usual manner and this motion is imparted through the filament 26 to the free end of short lever 25 which in turn causes the lever bar 17 to turn about the hinges 18, 19. This motion is transferred to the hinged portion of arm 11 through lever arm 20 and lever 24 to cause the element 13 to twist or bend thus changing its electrical resistance from that prior to the change in pressure. As shown in FIGURE 2, the strain sensitive element is incorporated in a bridge which is normally balanced at a desired reference pressure to which the Bourdon tube is subjected. At any departure from such reference pressure, the bridge will become unbalanced and the extent and direction of such change indicated by meter M.

The measurement of the pressure change can of course be made null reading and for this purpose a tension spring 27 of fused quartz is connected at one end to the full end of lever bar 25 and at its other end to a bellows 28 also of quartz. A screw threaded through the plate 29 mounted at the other end of the bellows may be adjusted to rebalance the bridge after a pressure change. An indicating mechanism can be operated by the screw, such as through gearing if desired, to provide a reading of the pressure change.

The strain sensitive element 14 also mounted on the fused quartz support 4 has properties similar to that of element 13 and is incorporated in the bridge circuit of FIGURE 2 as shown. Any undesirable strains which may be produced by uncontrollable accelerations such as are encountered in aircraft and any temperature changes which the strain sensing element may encounter will effect the resistances of elements 13 and 14 equally and not cause unbalance of the bridge circuit.

Other modifications will occur to one skilled in the art in utilizing the principles of this invention without departing from the spirit and scope thereof.

What is claimed is:

1. A pressure measuring instrument comprising a fused quartz Bourdon tube, a fused quartz frame member to which the tube is integrally secured, said frame member including a lever arm and a linearizing device, a strain sensitive element having an electrical resistance dependent on the strain to which it is subjected, means mounting the element on the frame member, and means for transferring the movement of the tip of the tube in accordance with a change in pressure through the quartz lever arm and linearizing device to strain the sensitive element, and means including the strain sensitive element for indicating the pressure change.

2. A pressure measuring instrument as defined in claim 1 in which the means mounting the strain sensitive element on the frame member comprises a fixed arm and a movable arm integrally formed with the frame at one end, the strain sensitive element extending between the free ends of the arms.

3. A pressure measuring instrument as defined in claim 2 in which the means for transferring the movement of the tube tip to the strain sensitive element comprises a linearizing device including a lever system of fused quartz extending between the tube tip and a movable arm for effecting movement of the strain sensitive element.

4. A pressure measuring instrument as defined in claim 2 in which the movable arm is hingedly connected to the frame member by an attenuated integrally formed portion of fused quartz material.

5. A pressure measuring instrument as defined in claim 3 in which the lever system of fused quartz includes at least one member movably connected to the support by an attenuated portion of the material integrally connecting the member and support.

6. A pressure measuring instrument as defined in claim 1 in which the pressure indicating means includes an electrical bridge circuit, one of the arms including the strain sensitive element, a source of current for energizing the bridge circuit and a meter coupled to the bridge circuit for providing an indication.

7. A pressure measuring instrument in accordance with claim 6 including a second strain sensitive element having the same characteristics as the first element and mounted on the frame member, said second strain sensitive element being included in a second arm of the bridge circuit.

8. A pressure measuring instrument as defined in claim 6 including means to return the bridge circuit to balanced condition comprising a quartz bellows and a quartz tension spring connected to the lever system, and means for moving the bellows to move the lever system through the spring until the bridge is balanced.

References Cited in the file of this patent

UNITED STATES PATENTS

| | | |
|---|---|---|
| 2,059,549 | Carlson | Nov. 3, 1936 |
| 2,279,261 | Crawford et al. | Apr. 7, 1942 |

OTHER REFERENCES

Vaughan: Review of Scientific Instruments, vol. 18, March 1947.